United States Patent [19]
Hoekzema

[11] Patent Number: 5,680,743
[45] Date of Patent: Oct. 28, 1997

[54] METHOD AND APPARATUS FOR CONVEYING LOAVES

[75] Inventor: Aldert J. Westra Hoekzema, Utrecht, Netherlands

[73] Assignee: Jongerius B.V., Netherlands

[21] Appl. No.: 613,135

[22] Filed: Mar. 8, 1996

[30] Foreign Application Priority Data

Mar. 28, 1995 [NL] Netherlands .................... 9500588

[51] Int. Cl.[6] .................................................. B65B 35/36
[52] U.S. Cl. ........................... 53/446; 53/435; 53/516; 53/543; 53/544; 198/399; 198/448
[58] Field of Search .......................... 53/435, 446, 516, 53/544, 543, 251; 198/399, 448, 951; 83/35, 102, 404.2, 407

[56] References Cited

U.S. PATENT DOCUMENTS

| | | | |
|---|---|---|---|
| 1,969,004 | 8/1934 | Hartman | 53/516 |
| 2,211,433 | 8/1940 | Papendick | 198/448 |
| 2,247,676 | 7/1941 | Thum | 198/448 |
| 2,247,694 | 7/1941 | Papendick | 198/448 |
| 2,247,698 | 7/1941 | Papendick | 198/448 |
| 3,693,486 | 9/1972 | Maniaci et al. | 198/448 |
| 4,429,781 | 2/1984 | Holzhauser | 198/448 |
| 4,512,137 | 4/1985 | Koberlein | |
| 4,720,024 | 1/1988 | Jongerius | |
| 4,856,263 | 8/1989 | Schneider et al. | 53/251 |
| 5,142,956 | 9/1992 | Ueno et al. | 83/102 |
| 5,327,704 | 7/1994 | Hoekzema et al. | |
| 5,349,968 | 9/1994 | Rizzoli et al. | 198/448 |

FOREIGN PATENT DOCUMENTS

| | | | |
|---|---|---|---|
| 5065131 | 3/1993 | Japan | 53/544 |
| 5147615 | 6/1993 | Japan | 53/544 |

*Primary Examiner*—Daniel Moon
*Assistant Examiner*—Ed Tolan
*Attorney, Agent, or Firm*—St. Onge Steward Johnston & Reens

[57] ABSTRACT

The invention relates to a method of conveying, slicing and packaging half loaves, starting from whole bread loaves. The loaves, which are conveyed perpendicularly to their longitudinal direction, are sliced in halves by a band slicer arranged in the path of conveyance, and one half from each loaf is turned 180° about an axis extending perpendicularly to the plane of conveyance of the loaves, and the halves of each loaf are positioned one behind the other, are sliced into slices and are packaged in bags. The half to be turned is accelerated in forward direction and is brought in front of the other half from the respective loaf during turning. The invention also relates to an apparatus including a turn table to turn said half.

12 Claims, 2 Drawing Sheets

//5,680,743

METHOD AND APPARATUS FOR CONVEYING LOAVES

BACKGROUND OF THE INVENTION

1. Field of the Invention

The present invention relates to a method of conveying, slicing and packaging half loaves.

2. Description of the Related Art

In bread factories and large bakeries it is customary that, after baking (and cooling), the loaves are supplied through a conveyor to a bread slicing machine where they are cut into slices and then packaged in plastic bags or the like. If half bread loaves should be packaged then it is customary that first of all the whole bread loaves are being sliced and that they are divided by hand in two halves on the face of it, said halves being packaged then in smaller bags. The disadvantage thereof is that it is labour intensive and the operation consumes a lot of time. As an alternative it is possible to directly bake half loaves in smaller loaf tins. This means, however, that an additional supply of tins should be acquired which is a large capital investment, while many people consider it a drawback that the half loaves have two heals.

In order to remove these drawbacks, U.S. Pat. No. 4,512,137 discloses a method and apparatus for conveying, slicing and packaging half loaves, wherein one starts from whole bread loaves which are conveyed perpendicularly to their longitudinal direction and which are sliced in halves by slicing means arranged in the path of conveyance, and each half from a loaf is turned 180° about an axis extending substantially perpendicularly to the plane of conveyance of the loaves before they are cut and the halves of each loaf are positioned one behind the other, are sliced into slices and are packaged in bags. In order to obtain this, the apparatus comprises a holding plate restraining the half to be turned 180° and releasing it for further conveyance after sufficient time, whereafter the further conveyed half is turned by means of a bar and a roller inclined to the direction of conveyance and is then brought through guides behind the half which is conveyed straight forward.

SUMMARY OF THE INVENTION

The object of the present invention is to further improve such method.

For this purpose, the method according to the invention is characterized in that the half to be turned is accelerated in forward direction and is brought in front of the other half from the respective loaf during turning.

Since not the half to be turned is restrained in order to bring it behind the other half, but on the contrary the half to be turned is accelerated in order to be brought in front of the half which is conveyed straight forward, one may obtain a greater through put speed.

The apparatus, preferably to perform said method, which comprises a first conveyor for conveying the loaves perpendicular to their longitudinal direction, in particular to a bread slicing machine, slicing means disposed substantially perpendicularly to the plane of the first conveyor for slicing loaves in two halves, and a positioning mechanism arranged behind the slicing means as seen in direction of conveyance, and adapted to turn one of the halves of each loaf through 180° about an axis extending substantially perpendicularly to the plane of conveyance of the conveyor and to bring all halves one behind the other, is characterized, according to the invention, in that the positioning mechanism includes movement means for displacing the half to be turned forwardly in order to bring it in front of the other half conveyed straight forward.

It is an advantage if the positioning mechanism comprises a driven turn table arranged such that it accomplishes both the turning movement and the lateral displacement of one of the halves relative to the other.

This turn table is a simple positioning mechanism and may accomplish the turning movement and forward displacement of the halves in a very reliable positive way.

A conceivable embodiment thereof is one in which the turn table is arranged such relative to a slicing portion of the slicing means that the center of rotation of the turn table is substantially aligned with the slicing portion, as seen in the direction of conveyance, a separating element extends above the turn table from the slicing portion of the slicing means to the neighbourhood of the center of rotation of the turn table.

Due to this arrangement, one of the halves which is on the side of the separating element where the turn table at that position moves away from the separating element, is turned around the separating element so to say and arrives in front of the other half. This will also happen if the turn table cooperates with a second conveyor for conveying the halves further from the turn table and preferably to a bread slicing machine.

The invention will hereinafter be further explained with reference to the drawing showing embodiments of the invention by way of example.

DESCRIPTION OF THE PREFERRED EMBODIMENTS

Figure 1:
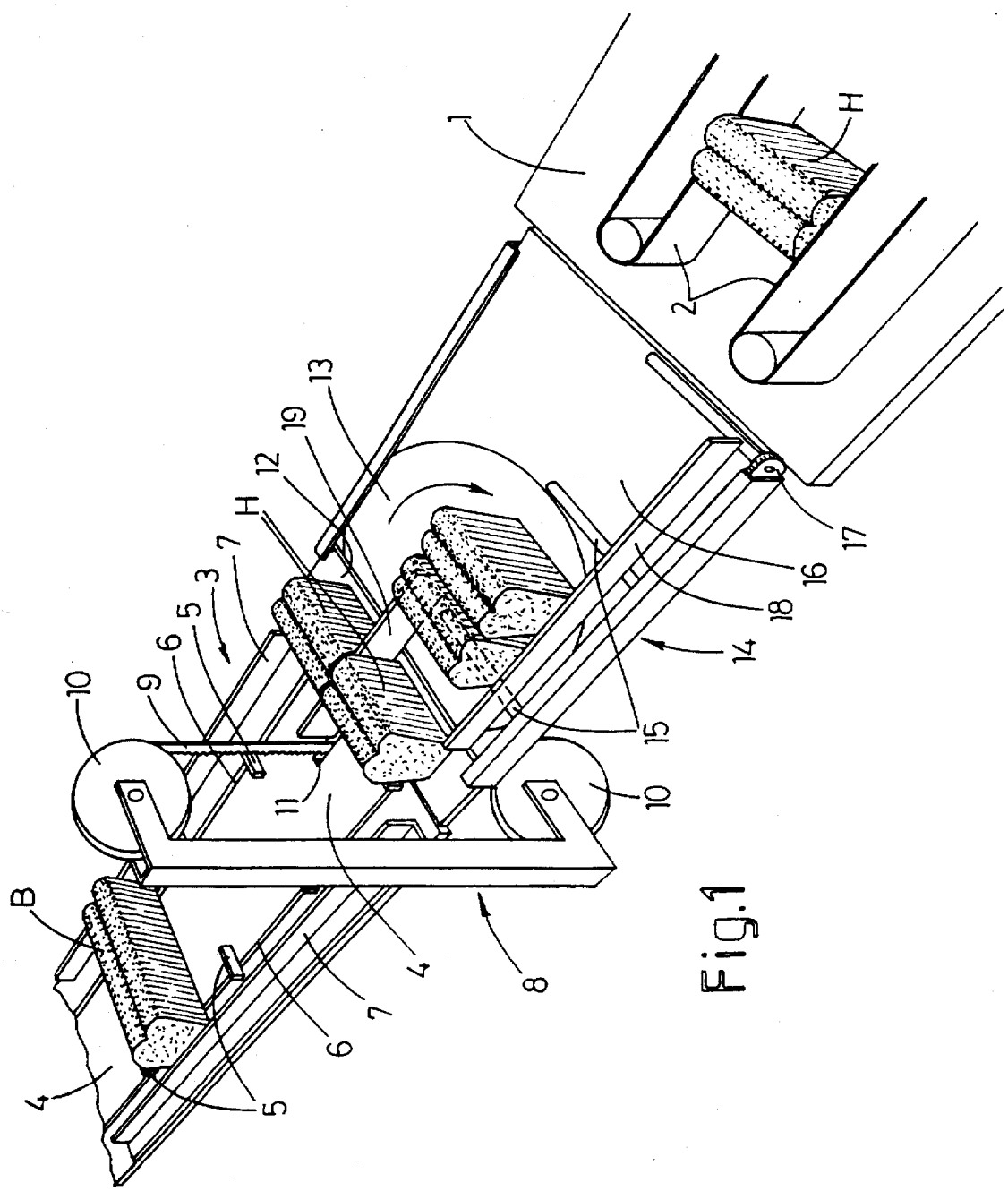
FIG. 1 is a very schematic perspective view of an examplary embodiment of an apparatus for conveying loaves.

The drawing and first of all FIG. 1, shows an apparatus for conveying loaves B from a collecting point (not shown), where the loaves arrive from the oven, to a bread slicing machine of which the drawing shows in its bottom right corner a feed table 1 having feed conveyors 2. The bread slicing machine itself may be of any suitable type, for example the one according to U.S. Pat. No. 4,720,024, the contents of which are incorporated by reference thereto. In most cases, the bread slicing machine is followed by an automatic bread packaging machine which is also not shown and may be of any suitable type, but preferably of the type as disclosed in U.S. Pat. No. 5,327,704 the contents of which are also incorporated by reference thereto. The bread slicing machine and bread packaging machine per se do not form part of the present invention.

The conveying apparatus includes a first conveyor 3 of which the last part is shown in the drawing and which may be of considerable length. In this case, the conveyor has a stationary conveying surface 4 with pushing means 5 driven above this conveying surface and in this embodiment being formed as two aligned vertical plates for each loaf B, also called paddles. The pushing means 5 are fixed to an endless conveying means at regular distances behind one another, said conveying means (not shown) may for example consist of a chain guided in a closed path below the conveying surface 4, while the pushing means 5 are fixed to the chain through connecting means running in slots 6 in the conveying surface. At the end of the conveying surface 4 of the first conveyor 3, the chain is guided back and the pushing means 5 disappear below the conveying surface to their return part. On both sides of the conveying surface 4 there are arranged centering borders 7 extending in longitudinal direction of the first conveyor 3 and ensuring that all loaves arrive at the end of the first conveyor 3 in the same lateral position. The centering borders 7 may be adjustable in order to be adapted to different length of the loaves B.

Near the end of the first conveyor 3 there is arranged a slicing means 8 for slicing the loaves B arriving at the end of the first conveyor 3 into two halves H. The slicing means 8 in this case consists of a band saw having a saw band 9 guided around rollers 10 and being driven. The slicing portion of the saw band 9 is guided through a slot shaped opening 11 in the transport surface 4 and the driving direction of the saw band 9 is such that the slicing portion of the saw band 9 above the conveying surface 4 moves in a direction to said conveying surface 4. As a result, the loaf has to be supported at the bottomside only and no additional restraining means is necessary on the top side.

Behind the first conveyor 3 there is a stationary platform 12 onto which the sliced halves H are pushed by the pushing means 5 turning around to their return part. As seen in the direction of conveyance there is arranged behind and partially below said platform 12 a turn table 13 such that the halves H may be pushed from the platform 12 onto the turn table 13 which takes place when the next halves arrive on the platform 12. The turn table 13 is motor driven and may be controlled by a switching means, for example embodied by a sensor, cam or the like, such that the drive of the turn table 13 only start if the halves H are pushed onto the turn table.

The turn table 13 cooperates with a second conveyor 14 which is equipped with pushing means 15 moving over one half of the turn table 13. The pushing means 15 are moved, in a spaced relationship, over the turn table and the conveying surface 16 connecting thereto, by means of an endless driving means in the form of a chain 17, such that the pushing means 15 return below the conveying surface 16 and the turn table 13. The conveying surface 16 of the second conveyor 14 extends up to the feed table 1 of the bread slicing machine. A border 18 extending in longitudinal direction borders the turn table 13 and the conveying surface 16 on the side of the second conveyor 14.

The drawing further illustrates that a separating element 19 extends from the saw band 9 of the slicing means 8 up to the neighbourhood of the center of rotation of the turn table 13, said center of rotation being substantially aligned with the saw band 9 of the slicing means 8 as seen in the direction of conveyance of the loaves B. The separating element 19 has the shape of an upright wall and is stationary such that the turn table 13 is allowed to move under it. The separating element 19 ensures that the halves H remain separate after they are being sliced by the saw band 9. The separating element 19 particularly performs a function when the halves H arrive on the turn table 13. The direction of rotation of the turn table 13 is such that at the position of the separating element 19, the turn table surface moves in a direction to the separating element 19 on the side of the second conveyor 14 and moves away from the separating element 19 on the other side. As a result, the half H on the side of the second conveyor 14 will be pushed against the separating element 19 due to the friction of the turn table 13, while on the contrary the half H on the opposite side is moved away from the separating element 19 by the turn table 13 and starts to follow the rotation of the turn table 13. The driving speeds of the first conveyor 3, the second conveyor 14 and the turn table 13 are mutually synchronised such that when the halves H arrive on the turn table 13 a pushing means 15 of the second conveyor 14 arrives behind one of the halves, while the other half is taken along by the turn table 13 with such speed that this half H arrives in front of the other half of this loaf which is conveyed straight forward and as a result the halves H are positioned one behind the other. During the rotation by the turn table 13, the one half H is not only displaced laterally in a direction to the other half H, but is also rotated about an axis perpendicularly to the conveying surface so that eventually the halves not only lie one behind the other but have also received the same orientation with the heals and the slicing faces directed to the same side. As a consequence, the halves are brought in the proper position in order to be supplied to the bread slicing machine one behind the other.

Figure 2:
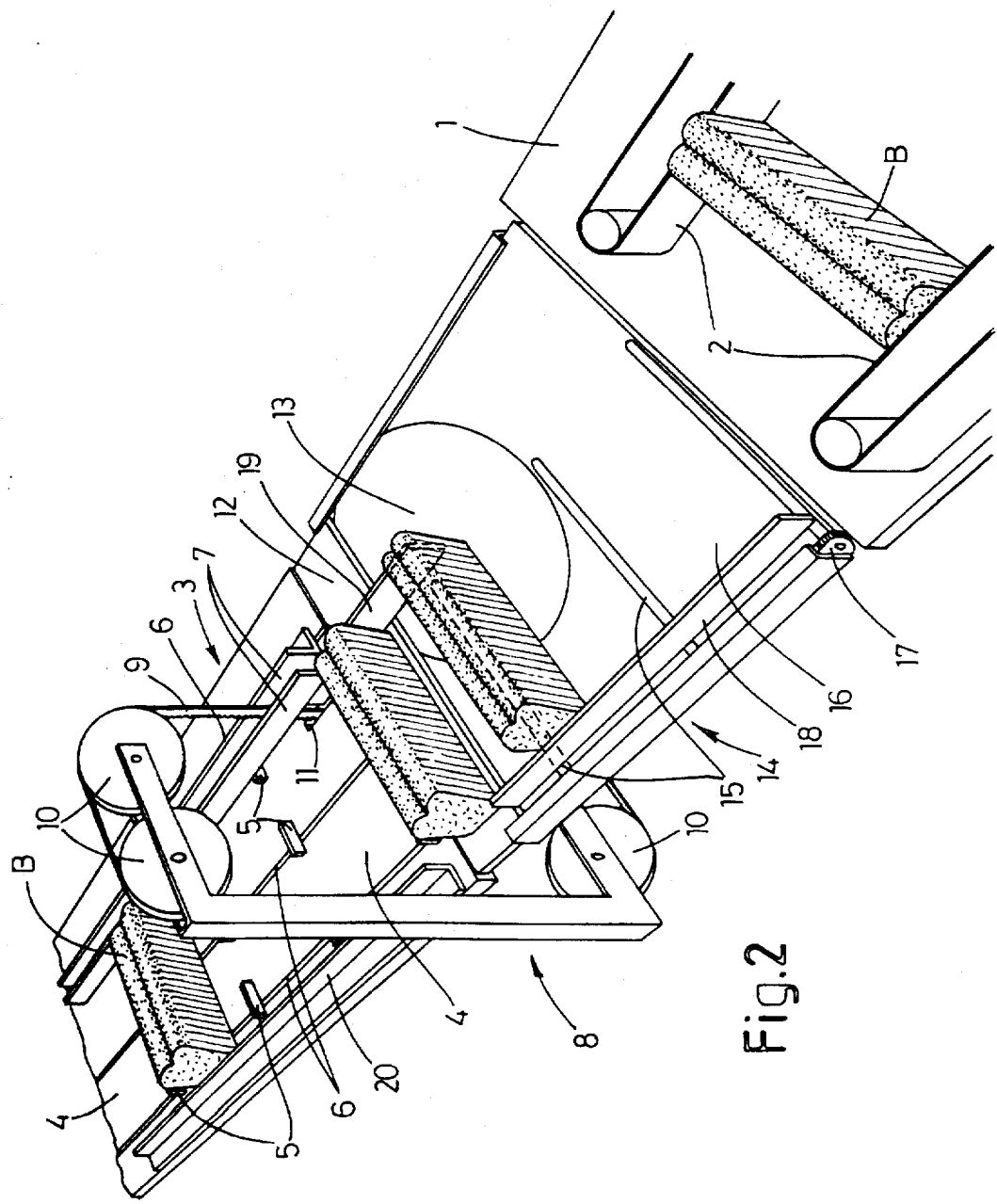
FIG. 2 shows a variant of the apparatus of FIG. 1 which is also suited for supplying whole bread loaves to a bread slicing machine.

FIG. 2 shows an alternative embodiment of the apparatus of FIG. 1, which is suited both for conveying loaves which should be sliced into halves and for conveying loaves which should be supplied to the bread slicing machine as whole loaves. For this purpose, the conveying surfaces 4 and 16 are extended laterally, there is provided an additional role of pushing means 5 in the first conveyor 3 and the pushing means 15 of the second conveyor 14 are lengthened. The conveying surfaces 4 and 16 are extended such that a whole loaf may be transported alongside the saw band 9 and the separating element 19. The centering borders 7 may be allowed to be symmetrically adjustable to such an extent, for example by means of spindles, that they move over the pushing means 5 and come to lie closely on opposite sides of the saw band 9 and there serve as single border. An additional border 20 guides the loaves on the other side. In the second conveyor 14 one may for example use the border 21 again which may be laterally slid over the pushing means 15. At least one of the feed conveyors 2 of the bread slicing machine should also be adjustable in lateral direction. Due to the adjustabilities mentioned, one and the same apparatus may be used for different uses.

The invention is not restricted to the embodiments shown in the drawing and described hereinbefore which may be varied in different manners within the scope of the invention. It is for example possible that instead of one half being rotated through 180°, both halves are rotated such that they arrive one behind the other with the same orientation. Also the direction of conveyance may be changed to contribute thereto.

I claim:

1. A method of conveying, slicing and packaging half loaves, starting from whole bread loaves (B) and wherein the half loaves are to be sliced and packaged into bags comprising the steps of:

conveying whole bread loaves perpendicularly to their longitudinal direction along a path of conveyance;

slicing the whole bread loaves into halves by slicing means arranged in the path of conveyance;

accelerating one of said halves in a forward direction along said conveyance path so as to bring said accelerated one half in front of the other half, which is cut from the same whole bread loaf, and while so accelerating said one half, turning said accelerated one half 180° about an axis extending substantially perpendicularly to a plane containing the path of conveyance of the loaves to position said accelerated one half in front of the other half from the same whole bread loaf so that halves of said loaves are one behind the other.

2. A method according to claim 1 wherein, during the turning step the other half is conveyed along a straight path and the one half to be turned is displaced forwardly of the other half to be brought, as seen in direction of conveyance, with heel alignment in front of the other half.

3. An apparatus for conveying and handling loaves, comprising:

a first conveyor having a surface for conveying the loaves in a first direction which is perpendicular to their longitudinal dimension towards a bread slicing machine;

slicing means disposed substantially perpendicularly to the surface of the first conveyor for slicing said loaves into two halves; and a positioning mechanism arranged behind the slicing means as seen in the direction of conveyance and comprising a turn table having a center of rotation so located relative to said sliced halves so as to provide both a turning movement and a forward displacement of one of the halves, and turn said one halves of each of said loaves through 180° about an axis extending substantially perpendicularly to the surface of the first conveyor and advance said one halves in front of the other half cut from the same loaf as the other half is conveyed and thereby bring said halves one behind the other.

4. An apparatus according to claim 3, wherein the turn table is arranged relative to a slicing portion of the slicing means such that the center of rotation of the turn table is substantially aligned with the slicing means, as seen alone the direction of conveyance, and a separating element extending above the turn table from the slicing means to the neighbourhood of the center of rotation of the turn table.

5. An apparatus according to claim 3, including a second conveyor arranged behind the turn table for conveying the halves further from the turn table to a bread slicing machine.

6. An apparatus according to claim 5, wherein a rotational speed of the turn table and a translatory speed of the second conveyor are adapted to each other such that the half turned by the turn table arrives just in front of the half which is conveyed straight forward.

7. An apparatus according to claim 6, wherein the second conveyor includes a plurality of circulating spaced pushing means guided over the turn table on one side of the separating element.

8. An apparatus according to claim 3, wherein the first conveyor includes a stationary conveying surface with pushing means for advancing the loaves and located above this conveying surface and wherein the slicing means has a slicing formed of a band saw moving in the direction to the conveying surface, through an opening in the conveying surface.

9. An apparatus according to claim 5, wherein the first conveyor and the second conveyor are equipped with lateral guides adjustable in a transverse direction relative to the direction of conveyance of the loaves and their sliced halves so as to accommodate the conveyance of whole bread loaves past a slicing portion of the slicing means.

10. An apparatus according to claim 3, wherein the turn table includes a drive mechanism which is controlled by means of switching means located above the loaves to sense the presence of loaves.

11. An apparatus for conveying, cutting and handling bread loaves, comprising:

a first conveyor having a surface for conveying the loaves perpendicularly to their longitudinal dimension towards a bread slicing machine;

slicing means disposed substantially perpendicularly to the surface of the first conveyor for slicing said loaves into two halves; and a turn table arranged behind the slicing means along the direction of conveyance of the loaves and having an axis of rotation substantially transverse to the conveying surface and a guide element located in alignment with the slicing means and the direction of conveyance so that said one half is located on one side and the other half of the same loaf is located on the other side of the guide element, and enable rotation of the turn table to urge the other half against the guide element while the one half is accelerated forwardly of the other half and turned to have the same orientation as said other half with the halves located one behind the other.

12. An apparatus for conveying bread loaves, comprising:

a first conveyor having a conveying surface for conveying the loaves perpendicularly to their longitudinal dimension on the conveying surface towards a bread slicing machine;

slicing means disposed substantially perpendicularly to the surface of the first conveyor for slicing said loaves in two halves; and a positioning mechanism arranged behind the slicing means as seen in the direction of conveyance, means for accelerating one half of each of said loaves and for turninq said one halves of each of said loaves about an axis extending substantially perpendicularly to the conveying surface of the first conveyor so as to bring the accelerated and turned halves in front of the other halves cut from respectively the same loaves and place all halves one behind the other with the same heel orientation.

* * * * *